Oct. 4, 1932.  A. C. SCHMIDT  1,881,390

BUMPER FOR AUTOMOTIVE VEHICLES

Filed Jan. 23, 1931

INVENTOR.
Adolph C. Schmidt
BY
Harry C. Schweds
ATTORNEY

Patented Oct. 4, 1932

1,881,390

UNITED STATES PATENT OFFICE

ADOLPH C. SCHMIDT, OF OAKLAND, CALIFORNIA

BUMPER FOR AUTOMOTIVE VEHICLES

Application filed January 23, 1931. Serial No. 510,719.

This invention is for a bumper for automotive vehicles, and has special reference to an elastic bumper adapted to replace the usual rigid or semi-resilient bumpers as presently used on automotive vehicles.

The present type of bumper, in case of collision, transmits a severe shock to the frame of the vehicle which often distorts the frame. The bumper is also often used for aiding a motorist who is stalled from various causes, such as shortage of gas. In pushing a car with the present style of bumper, the bumpers are usually scratched or marred and when contact is made, it is usually with a shock, and it is for these specific purposes that the present invention was evolved.

Therefore, the main object of the invention is to provide an elastic bumper for vehicles, which will absorb the shock on collision or when pushing another car, and prevent the marring of bumpers of the rigid type.

Another object of the invention is to provide an inflatable bumper which may be inflated to any desired pressure, and which will efficiently protect a car against damage in the case of light collisions.

Other objects and advantages of the invention will become apparent as the following description is read on the drawing forming a part of this specification.

The invention consists primarily of a rigid bumper element secured to the frame or springs of an automotive vehicle, by means of the usual brackets, the element being formed of any standard clincher rim rolled formed of a flat bar of section, or may be formed of a flat bar of stock with both side edges flanged inwardly. An elastic element consisting of an elongated casing and an inner tube is retained, by inflation, on the bumper element.

The invention is adequately illustrated in the accompanying drawing in which.

Similar reference characters are used to designate similar parts throughout the several views.

A rigid bumper element 10 is flanged in at both sides as indicated at 11, as also at the ends, as indicated at 12. An aperture is provided to clear the usual tire valve 13 used for inflating the inner tube 14.

The inner tube 14 consists of the usual tubular section of rubber, closed at both ends to parabolic form instead of the toroidal tube used as inner tubes for automobile tires.

Figure 1:
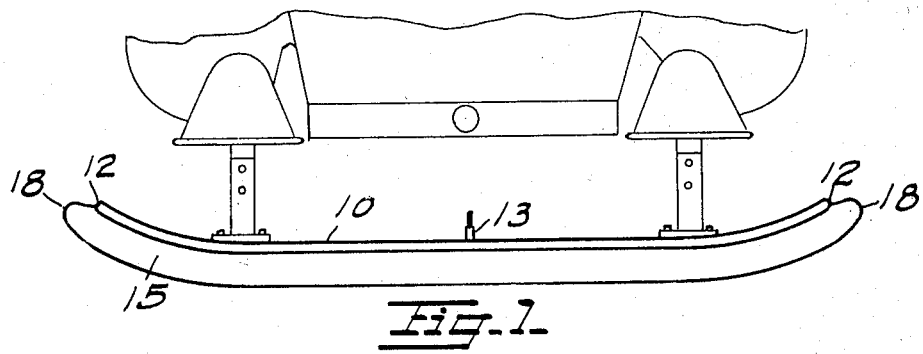
Fig. 1 is a fragmentary plan view of the front end of an automobile showing my invention installed thereon.
Figure 2:
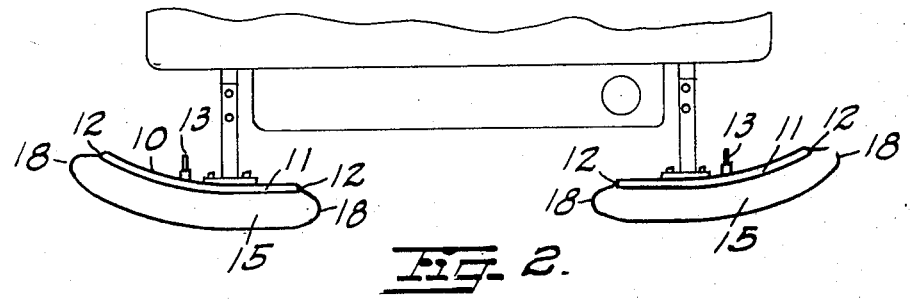
Fig. 2 is a fragmentary plan view of the rear end of an automobile showing my invention as applied to the rear thereof.
Figure 4:
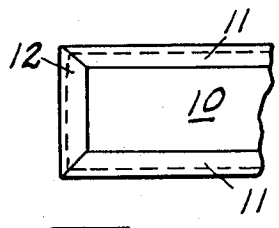
Fig. 4 is a view showing the construction of the ends of the rigid bumper element.
Figure 3:
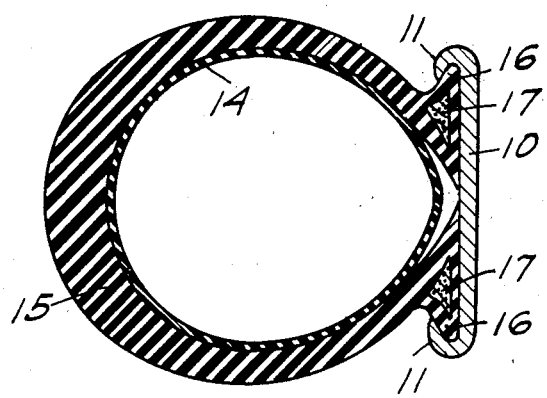
Fig. 3 is a cross-section through the rigid bumper element, the casing and the inner tube, as assembled.
Figure 5:
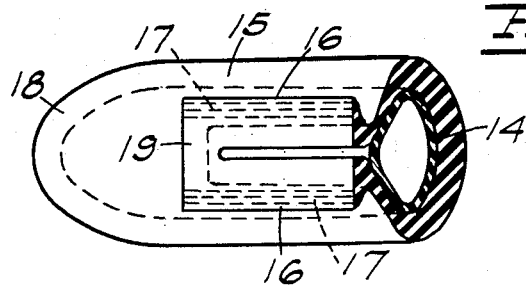
Fig. 5 is a view showing the construction of the ends of the elastic element.

The casing 15 consists of the usual clincher tire section in which beads 16 are provided with reinforcing 17 which is usually made in the form of a bunch of steel wires, about which the usual fabric is first applied with vulcanizable compositions, after which the usual gum compositions are applied, forming a section similar to that indicated in Fig. 3. The ends 18 of the casing are formed similar to the ends of the tube, of substantially parabolic form. The ends of beads 16 terminate in a cross bead 19 in which no reinforcement is provided, as reinforcing at this point would prevent insertion of the bead 19 in flange 12, as this bead could not then be distorted or compressed.

The inflatable element is readily removable in case of puncture or leakage, and as readily replaced after repairs have been made.

It may be inflated to any desired pressure by means of the valve 13 although a low pressure of ten to twenty pounds is believed to be the more satisfactory, as maximum elasticity is desirable.

Having described an operative method of constructing the device, it will be understood that variations in construction and arrangement of parts which are consistent with the appended claims may be resorted to without detracting from the spirit or scope of the invention or sacrificing any of the advantages thereof.

I claim:—

1. A bumper, in combination with a rigid supporting element having means adapted to cooperate with clincher beads on a casing, a resilient casing of elongated form and having closed ends, a slot extending longitudinally substantially throughout the length thereof, a bead formed about said slot and provided with longitudinal reinforcing means, the transverse bead being without reinforcement, an elongated tubular elastic element having closed ends and provided with a tire valve and disposed within said casing.

2. A bumper, in combination with a rigid supporting element having means adapted to cooperate with clincher beads on a casing, and an aperture for reception of a tire valve; an elongated elastic tubular element having closed ends and provided with a tire valve for inflation thereof, a resilient casing of elongated form having closed ends, a slot extending longitudinally substantially throughout the length of said casing and a clincher bead formed about and extending outwardly from said slot, said bead having rigid reinforcing means in the longitudinal portions thereof the transverse portions of said bead being without rigid reinforcing means.

3. A bumper, in combination with a rigid supporting element having inturned flanges along both sides and across both ends, an elongated elastic tubular element having a bead cooperating with said flanges, a slot formed longitudinally and terminating at the transverse portions of said bead, rigid reinforcing means in the longitudinal portions of said bead, the transverse portions thereof being formed of resilient material.

In testimony whereof I have affixed my signature.

ADOLPH C. SCHMIDT.